(12) United States Patent
Badillo

(10) Patent No.: US 12,024,949 B2
(45) Date of Patent: Jul. 2, 2024

(54) VEHICLE LADDER ATTACHMENT MECHANISM

(71) Applicant: INTELLIGENT DESIGNS 2000 CORP., Aurora, CO (US)

(72) Inventor: Paul Badillo, Littleton, CO (US)

(73) Assignee: Intelligent Designs 2000 Corp., Aurora, CO (US)

( * ) Notice: Subject to any disclaimer, the term of this patent is extended or adjusted under 35 U.S.C. 154(b) by 769 days.

(21) Appl. No.: 16/984,973

(22) Filed: Aug. 4, 2020

(65) Prior Publication Data

US 2020/0362631 A1  Nov. 19, 2020

Related U.S. Application Data

(63) Continuation of application No. 16/040,797, filed on Jul. 20, 2018, now Pat. No. 10,738,532, which is a continuation of application No. 14/881,979, filed on Oct. 13, 2015, now Pat. No. 10,030,446.

(60) Provisional application No. 62/206,724, filed on Aug. 18, 2015.

(51) Int. Cl.
*E06C 5/24* (2006.01)
*B60R 3/00* (2006.01)
*B62D 65/16* (2006.01)

(52) U.S. Cl.
CPC ............... *E06C 5/24* (2013.01); *B60R 3/005* (2013.01); *B62D 65/16* (2013.01)

(58) Field of Classification Search
CPC ... E06C 1/36; E06C 5/24; E06C 7/188; B60R 3/005; B60R 3/02; B60R 3/04; B62D 65/16; F16B 2/065
See application file for complete search history.

(56) References Cited

U.S. PATENT DOCUMENTS

| | | | | |
|---|---|---|---|---|
| 563,085 | A | * 6/1896 | Smith | ..... E01B 23/04 |
| | | | | 238/269 |
| 1,443,391 | A | * 1/1923 | Soldat | ..... F16B 7/0493 |
| | | | | 211/183 |
| 2,227,873 | A | 1/1941 | Bartsch | |
| 2,322,798 | A | * 6/1943 | Fischer | ..... B60R 1/06 |
| | | | | D12/189 |
| 2,398,306 | A | * 4/1946 | Hermanson | ..... E04G 7/28 |
| | | | | 403/385 |
| 2,419,065 | A | 4/1947 | Fowler | |
| 2,481,120 | A | * 9/1949 | Juel | ..... B61F 15/06 |
| | | | | 384/158 |
| 2,485,413 | A | 10/1949 | Ross | |
| D173,148 | S | 10/1954 | Emmite | |

(Continued)

OTHER PUBLICATIONS

U.S. Appl. No. 29/183,072, filed Jun. 4, 2003 now U.S. Pat. No. D512,783.

(Continued)

*Primary Examiner* — Daniel P Cahn
*Assistant Examiner* — Shiref M Mekhaeil
(74) *Attorney, Agent, or Firm* — Sheridan Ross P.C.

(57) ABSTRACT

A system is provided for interconnecting a ladder to a vehicle. The system may include a first portion for interconnecting to an upper portion of a vehicle rear door and a second portion for interconnecting to a lower portion of the vehicle rear door. The system provides a ladder interconnection wherein no penetrations are made into the vehicle.

7 Claims, 13 Drawing Sheets

(56) References Cited

U.S. PATENT DOCUMENTS

| | | | |
|---|---|---|---|
| 2,693,386 A * | 11/1954 | Renfroe | B66C 1/48 |
| | | | 280/502 |
| D176,238 S | 11/1955 | Wallace et al. | |
| 2,947,555 A | 8/1960 | Olsen | |
| 3,028,929 A | 4/1962 | Chubbs | |
| 3,058,607 A | 10/1962 | Kiley | |
| 3,245,029 A * | 4/1966 | Piperato | H01R 9/26 |
| | | | 439/716 |
| 3,387,754 A | 6/1968 | Sinkey | |
| 3,431,005 A * | 3/1969 | Priefert | B60R 19/52 |
| | | | 280/491.4 |
| 3,498,410 A | 3/1970 | Storch | |
| 3,544,955 A * | 12/1970 | Ruiz | H01R 4/32 |
| | | | 439/798 |
| 3,601,294 A * | 8/1971 | Gjesdahl | B60R 9/12 |
| | | | 224/315 |
| 3,603,431 A | 9/1971 | Nameche et al. | |
| 3,604,676 A * | 9/1971 | Weber | F16L 3/1075 |
| | | | 248/231.51 |
| D222,526 S | 11/1971 | Meier | |
| 3,965,525 A * | 6/1976 | Brissette | A47L 9/02 |
| | | | 15/373 |
| D241,614 S | 9/1976 | Wallace | |
| 4,151,895 A | 5/1979 | Rasada, Jr. et al. | |
| 4,239,139 A | 12/1980 | Bott | |
| 4,249,683 A | 2/1981 | Park | |
| 4,312,620 A | 1/1982 | Muschalek, Jr. | |
| 4,320,816 A | 3/1982 | Callahan | |
| 4,431,082 A | 2/1984 | Bott | |
| 4,613,120 A * | 9/1986 | Kozar | B25B 5/16 |
| | | | 269/282 |
| 4,691,907 A * | 9/1987 | Yang | B25B 5/163 |
| | | | 269/152 |
| 4,716,988 A | 1/1988 | Graffy | |
| 4,719,989 A | 1/1988 | Ritten | |
| 4,825,975 A | 5/1989 | Symes | |
| 4,831,808 A | 5/1989 | Wynar | |
| 4,901,963 A * | 2/1990 | Yoder | B25B 5/103 |
| | | | 24/514 |
| D309,560 S | 7/1990 | Warlick | |
| 4,947,961 A | 8/1990 | Dudley | |
| 4,953,820 A * | 9/1990 | Yoder | B25B 5/103 |
| | | | 248/231.51 |
| 5,039,119 A * | 8/1991 | Baughman | B60R 3/005 |
| | | | 182/127 |
| 5,058,652 A * | 10/1991 | Wheatley | B60J 7/104 |
| | | | 296/100.18 |
| 5,121,960 A * | 6/1992 | Wheatley | B60J 7/104 |
| | | | 296/100.18 |
| 5,131,780 A * | 7/1992 | Love | B25B 5/101 |
| | | | 24/522 |
| 5,228,739 A | 7/1993 | Love | |
| 5,275,458 A * | 1/1994 | Barben | B60J 7/104 |
| | | | 296/100.18 |
| D346,355 S | 4/1994 | Weger, Jr. et al. | |
| D346,994 S | 5/1994 | Weger, Jr. et al. | |
| 5,310,238 A * | 5/1994 | Wheatley | B60J 7/104 |
| | | | 296/100.18 |
| D359,134 S | 6/1995 | Toews | |
| 5,573,228 A * | 11/1996 | Chestnut | B25B 5/142 |
| | | | 269/41 |
| 5,636,893 A * | 6/1997 | Wheatley | B60J 7/141 |
| | | | 296/100.09 |
| D389,450 S * | 1/1998 | Wilson | D12/223 |
| D392,178 S | 3/1998 | Hirano | |
| 5,765,902 A * | 6/1998 | Love | B60J 7/104 |
| | | | 248/228.1 |
| 5,788,315 A * | 8/1998 | Tucker | B60J 7/102 |
| | | | 160/395 |
| D410,374 S | 6/1999 | Meurer | |
| 5,931,521 A * | 8/1999 | Kooiker | B60J 7/141 |
| | | | 296/100.09 |
| 5,975,618 A * | 11/1999 | Rippberger | B60J 7/104 |
| | | | 296/100.18 |
| 6,003,633 A | 12/1999 | Rolson | |
| 6,023,800 A * | 2/2000 | Stickley | A61G 7/0507 |
| | | | 5/503.1 |
| D423,328 S | 4/2000 | Burrows | |
| 6,116,378 A | 9/2000 | Barrow | |
| D442,289 S | 5/2001 | Ziaylek et al. | |
| 6,231,093 B1 * | 5/2001 | Storer | B60R 19/52 |
| | | | 293/115 |
| 6,256,844 B1 * | 7/2001 | Wheatley | B61D 45/001 |
| | | | 410/110 |
| 6,257,537 B1 * | 7/2001 | Williams | A01M 29/32 |
| | | | 248/213.1 |
| 6,270,301 B1 * | 8/2001 | Dunlop | B60P 7/0815 |
| | | | 410/104 |
| 6,338,520 B2 * | 1/2002 | Rusu | B60J 7/1621 |
| | | | 296/100.09 |
| 6,350,089 B1 * | 2/2002 | Tekavec | B60P 7/0807 |
| | | | 410/116 |
| 6,378,654 B1 | 4/2002 | Ziaylek, Jr. et al. | |
| 6,409,275 B1 | 6/2002 | Gerding | |
| 6,442,805 B2 * | 9/2002 | Pfister | F16B 7/0473 |
| | | | 24/514 |
| 6,520,559 B1 * | 2/2003 | Steffens | B60J 7/141 |
| | | | 296/100.09 |
| 6,565,048 B1 * | 5/2003 | Meyer | F16L 3/02 |
| | | | 248/58 |
| D479,884 S | 9/2003 | Berryman | |
| 6,725,623 B1 * | 4/2004 | Riddell | E04D 13/10 |
| | | | 52/750 |
| D490,163 S | 5/2004 | Thurston | |
| 6,739,349 B2 | 5/2004 | Kastenschmid et al. | |
| 6,905,153 B2 * | 6/2005 | Murray | B60R 19/44 |
| | | | 293/154 |
| 6,948,588 B1 | 9/2005 | Chustak | |
| D512,783 S | 12/2005 | Badillo | |
| 7,017,238 B2 * | 3/2006 | Messina | F16L 3/12 |
| | | | 24/514 |
| 7,025,712 B2 * | 4/2006 | Parrilla | A63B 71/0036 |
| | | | 482/94 |
| 7,055,787 B2 * | 6/2006 | Cross | B25B 5/10 |
| | | | 269/37 |
| 7,066,299 B1 | 6/2006 | Fleming | |
| D538,734 S | 3/2007 | Reimitz | |
| D547,641 S | 7/2007 | Jueneman | |
| 7,244,090 B2 | 7/2007 | Wooten et al. | |
| 7,249,927 B2 | 7/2007 | Wooten et al. | |
| D549,838 S | 8/2007 | Badillo | |
| D601,719 S | 10/2009 | Gibson | |
| 7,789,359 B2 * | 9/2010 | Chopp, Jr. | H02G 3/0456 |
| | | | 248/210 |
| 7,819,225 B2 | 10/2010 | Smith | |
| 7,874,966 B2 | 1/2011 | Parrilla | |
| 7,946,643 B2 * | 5/2011 | Getschel | B60J 7/1621 |
| | | | 296/100.1 |
| D657,054 S * | 4/2012 | Bacon | D24/128 |
| 8,157,229 B2 * | 4/2012 | Palermo | B60P 7/0815 |
| | | | 224/403 |
| 8,261,880 B1 * | 9/2012 | Hop | E06C 7/182 |
| | | | 182/100 |
| 8,496,146 B2 | 7/2013 | Badillo | |
| 8,523,128 B2 * | 9/2013 | Palermo | B60P 7/0815 |
| | | | 224/403 |
| 8,585,107 B2 * | 11/2013 | Kekich, Jr. | B60R 19/52 |
| | | | 293/115 |
| D694,607 S * | 12/2013 | Lee | D8/74 |
| 8,602,162 B2 | 12/2013 | Dondurur et al. | |
| 8,690,224 B2 * | 4/2014 | Maimin | B60P 7/02 |
| | | | 296/100.09 |
| D710,030 S | 7/2014 | Fitzgerald et al. | |
| 8,857,771 B2 * | 10/2014 | Streetman | F16L 3/133 |
| | | | 248/65 |
| 9,248,784 B2 * | 2/2016 | Kraeuter | B60R 9/10 |
| 9,345,923 B2 | 5/2016 | Haggard et al. | |
| D759,841 S | 6/2016 | Badillo | |
| D770,962 S | 11/2016 | Badillo | |

(56) References Cited

U.S. PATENT DOCUMENTS

| | | | |
|---|---|---|---|
| 9,527,712 B1 | 12/2016 | Pigg et al. | |
| D812,777 S | 3/2018 | Ma et al. | |
| 9,945,179 B1 | 4/2018 | Joldersma | |
| D822,851 S | 7/2018 | Conner | |
| 10,030,446 B2 | 7/2018 | Badillo | |
| 10,046,724 B2* | 8/2018 | Ghannam | B60R 19/52 |
| 10,106,022 B2* | 10/2018 | Xu | B60J 7/1858 |
| D832,760 S | 11/2018 | Annett | |
| D845,853 S | 4/2019 | Annett | |
| 10,359,212 B2* | 7/2019 | Darby | F24F 1/027 |
| D882,119 S | 4/2020 | Badillo | |
| 10,738,532 B2 | 8/2020 | Badillo | |
| 10,746,209 B2* | 8/2020 | Voegele | B60J 7/198 |
| 10,760,298 B2* | 9/2020 | Crandall | E04H 17/1417 |
| D906,546 S | 12/2020 | Badillo | |
| 11,162,518 B1* | 11/2021 | Macy | F16B 2/065 |
| 11,352,793 B2* | 6/2022 | Haddock | F16B 2/065 |
| 2003/0020253 A1 | 1/2003 | Bosman et al. | |
| 2004/0069566 A1 | 4/2004 | Bareket | |
| 2005/0039983 A1 | 2/2005 | Tombarello | |
| 2005/0082326 A1 | 4/2005 | Badillo | |
| 2005/0098595 A1* | 5/2005 | Smith | B60R 9/0485 |
| | | | 224/319 |
| 2006/0108179 A1 | 5/2006 | Sieb | |
| 2006/0124394 A1* | 6/2006 | Bracken | E06C 1/34 |
| | | | 182/107 |
| 2006/0191967 A1* | 8/2006 | Smith | B60R 9/0485 |
| | | | 224/319 |
| 2008/0250614 A1* | 10/2008 | Zante | F16B 5/0657 |
| | | | 24/542 |
| 2008/0264688 A1* | 10/2008 | Chopp | H02G 3/263 |
| | | | 174/503 |
| 2008/0277199 A1 | 11/2008 | Castonguay | |
| 2008/0295301 A1* | 12/2008 | Carnevali | F16M 13/022 |
| | | | 24/569 |
| 2009/0004895 A1* | 1/2009 | Duley | H01R 11/01 |
| | | | 439/92 |
| 2009/0184222 A1* | 7/2009 | Osborn | F16L 3/18 |
| | | | 248/231.71 |
| 2009/0258548 A1* | 10/2009 | Kossak | F16B 2/065 |
| | | | 439/803 |
| 2010/0301178 A1* | 12/2010 | Myers | F16B 2/12 |
| | | | 248/74.1 |
| 2011/0132252 A1 | 6/2011 | Kaye | |
| 2012/0096691 A1* | 4/2012 | Sacks | F16B 2/12 |
| | | | 24/455 |
| 2013/0227907 A1* | 9/2013 | Gulbrandsen | E04B 9/30 |
| | | | 52/665 |
| 2015/0252618 A1* | 9/2015 | Levi | E06C 5/24 |
| | | | 182/127 |
| 2016/0159437 A1 | 6/2016 | Pappas et al. | |
| 2018/0044985 A1 | 2/2018 | Orscheln et al. | |
| 2018/0201195 A1 | 7/2018 | Downing | |
| 2018/0328389 A1* | 11/2018 | Bockarev | F16B 2/065 |
| 2019/0351832 A1 | 11/2019 | Fuller et al. | |
| 2021/0079605 A1* | 3/2021 | McAllister | G10K 11/162 |
| 2022/0104384 A1* | 3/2022 | Chen | H04Q 1/14 |

OTHER PUBLICATIONS

U.S. Appl. No. 29/246,929, filed May 22, 2006 now U.S. Pat. No. D549,838.

U.S. Appl. No. 29/535,867, filed Aug. 11, 2015 now U.S. Pat. No. D759,841.

U.S. Appl. No. 29/541,154, filed Sep. 30, 2015 now U.S. Pat. No. D770,962.

U.S. Appl. No. 14/881,979, filed Oct. 13, 2015 now U.S. Pat. No. 10,030,446.

U.S. Appl. No. 16/040,797, filed Jul. 20, 2018 now U.S. Pat. No. 10,738,532.

U.S. Appl. No. 29/589,364, filed Dec. 30, 2016 now U.S. Pat. No. D882,119.

U.S. Appl. No. 29/731,987, filed Apr. 20, 2020 now U.S. Pat. No. D906,546.

"FJ Ladder," BajaRack Adventure Equipment, 2 pages, first sale estimated in 2011 [retrieved from: http://www.bajarack.com/ladder].

* cited by examiner

VEHICLE LADDER ATTACHMENT MECHANISM

This application is a Continuation application of, and claims priority to, U.S. patent application Ser. No. 16/040,797 filed on Jul. 20, 2018, now U.S. Pat. No. 10,738,532, which is a Continuation application of, and claims priority to, U.S. patent application Ser. No. 14/881,979 filed on Oct. 13, 2015, now U.S. Pat. No. 10,030,446, which claims the benefit of U.S. Provisional Patent Application Ser. No. 62/206,724, filed Aug. 18, 2015, the entirety of each of which is incorporated by reference herein.

FIELD OF THE INVENTION

Embodiments of the present invention are generally related to motor vehicle storage racks and ladders.

BACKGROUND OF THE INVENTION

Vehicle roof racks provide vehicle owners with additional storage options. The storage space roof racks provide allow the area inside the vehicle to be used for additional in-vehicle storage or passenger seating. Often, access to storage racks is difficult, because one must reach upwardly to gain access to the vehicle rack, which is often over six feet from the ground. Standing locations on the outside of the vehicle that would allow one to reach the roof rack are rare or difficult/dangerous to access. For example, some individuals stand on the vehicle's floor or tire to access the storage rack. Unfortunately, the vehicle owner's height, the position of the rack, or the location of the stored items in the rack are often not ideally accessed by standing on the vehicle floor or tire. Thus owners must use a step stool, a ladder, etc. to access the roof rack, which is often not readily available.

To address this issue some vehicle manufacturers have incorporated ladders onto the side or rear of the vehicle. These ladders increase the external envelope of the vehicle and are often unsightly. Existing ladders (or post-market ladders retrofitted onto vehicles) must be bolted to the vehicle, which creates weak points and fluid pathways that facilitate metal oxidation. Further, where the vehicle ladder is interconnected to the rear of the vehicle, rear door operation may be adversely affected.

It is a long felt need to provide an improved ladder that does not require penetrations into the vehicle to install, is aesthetically pleasing, and allows for the vehicle's rear door to function as designed.

SUMMARY OF THE INVENTION

It is one aspect of embodiments of the present invention to provide a ladder attachment mechanism wherein no penetrations are made into the vehicle during installation. More specifically, one embodiment of the present invention is a ladder connection mechanism that employs components that interconnect independently to two distinct portions of the vehicle's rear door without affecting the integrity of the door. In operation, one component—a hanger plate—is interconnected to an upper portion of the vehicle's rear door adjacent to a hinge that interconnects the rear door to the vehicle. The hanger plate is fastened in such a way to not interfere with the operation of the hinge and provides a primary ladder retention location.

The ladder attachment system also includes a second component—a clamp—for interconnection to a bottom edge of the rear door. The clamp does not impede the rear door closing. The lower clamp secures a lower portion of the ladder, and with the hanger plate, secures a ladder to the vehicle. The ladder is adapted to move with the rear door as it is opened and closed.

The hanger plate has an added feature in that it helps distribute loads generated by applied weight. More specifically, as many manufacturers employ rear hatchback doors with plastic spoilers or other devices to improve vehicle aesthetics, the hanger plate must provide a sufficient footprint to spread applied loads and reduce pressure when individuals are using the ladder.

It is yet another aspect of embodiments of the present invention to provide a hanger plate and clamp that can be interconnected to various vehicles. That is, the hanger plate may be configured to accommodate vehicles of different manufacturers. Some hanger plates, however, are custom-made to fit certain vehicle models, which will be described in further detail below. Some other contemplated hanger plates include features that allow them to be quickly modified by removing or adding portions thereto so various vehicles can be accommodated with one hanger plate design.

It is still yet another aspect of embodiments of the present invention to provide a ladder attachment system that can be positioned on a driver side or a passenger side of the vehicle. More specifically, depending on the location of a spare tire or the owner's desires, it may be more advantageous to install the ladder on a particular side of the rear door. Some embodiments of the present invention allow users to install the hanger plate on either side of the rear door so it accommodates the hinge on either side of the rear door.

It follows that embodiments of the present invention are easy to install such that if the owner changes their mind, the position of the hanger plate and associated clamp can be selectively altered. Again, one primary aspect of embodiments of the present invention is that interconnecting the hanger plate or clamp to the vehicle does not require penetrations be made into the vehicle, which helps increase resale value, and helps decrease the occurrences of oxidation.

It is another aspect of some embodiments of the present invention to provide a system adapted for interconnecting a ladder to a vehicle, wherein the system secures the ladder to the vehicle, the system comprising: a hanger plate adapted for interconnection to an upper portion of a rear door of the vehicle, the hanger plate having an edge with a curled portion adapted for engaging an edge of the upper portion of the rear door, a lower surface adapted for engaging an upper surface associated with the edge of the rear door, and an upper surface having a stud extending therefrom; a clamp adapted for interconnection to a lower portion of a rear door, the clamp having a first portion adapted for positioning adjacent to an inner surface of the rear door, a second surface adapted for positioning adjacent to a lower edge of the rear door, and an outer surface adapted for positioning adjacent to an outer surface of the rear door, the clamp operatively interconnected to a member adapted to selectively engage the rear door, thereby interconnecting the clamp to the rear door; wherein the ladder has an upper portion that interconnects to the stud of the hanger plate; and wherein the ladder has a lower portion adapted for engagement with the rear door and for engagement with the third portion of the clamp.

It is another aspect of some embodiments of the present invention to provide a system adapted for providing access to an upper portion of a vehicle, comprising: a hanger plate adapted for interconnection to an upper portion of a rear door of the vehicle, the hanger plate having an edge with a portion adapted for engaging an edge of the rear door, the hanger plate having a stud extending therefrom; a clamp adapted for interconnection to a lower portion of the rear door, the clamp operatively interconnected to a member adapted to selectively engage the rear door; and a ladder having an upper portion that interconnects to the stud of the hanger plate, and a lower portion interconnected to the clamp.

It is another aspect of some embodiments of the present invention to provide a method of interconnecting a ladder to a vehicle, comprising: providing a hanger plate; providing a clamp; interconnecting the hanger plate to an upper edge of a vehicle rear door, the hanger plate having an edge with a portion that engages the upper edge of the vehicle rear door; interconnecting an upper portion of the ladder to studs extending from the hanger plate, the studs being positioned through apertures in the upper portion of the ladder, wherein the ladder is fastened to the hanger plate by way of a nut received on the stud; and interconnecting the clamp to a lower edge of the vehicle rear door, wherein the clamp has an internal portion positioned on an internal surface of the vehicle rear door and an external portion positioned on an external portion of the rear door, the ladder having a lower portion positioned between the rear door and the external portion, and the clamp having a means for pinching operatively interconnected to the internal portion and adapted for interconnection to the internal surface of the rear door.

It is another aspect of some embodiments of the present invention to provide a hanger plate adapted to secure a ladder to an upper portion of a vehicle rear door, comprising: a plate having a first edge, a second edge, a third edge, and a forth edge, the first edge adapted for interconnection to an inner upper edge of the rear door, the second edge adapted for positioning adjacent to an outer upper edge of the rear door, and the third edge and the fourth edge interconnecting the first edge and the second edge; a curled portion interconnected to the first edge; and at least one stud extending from the plate.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
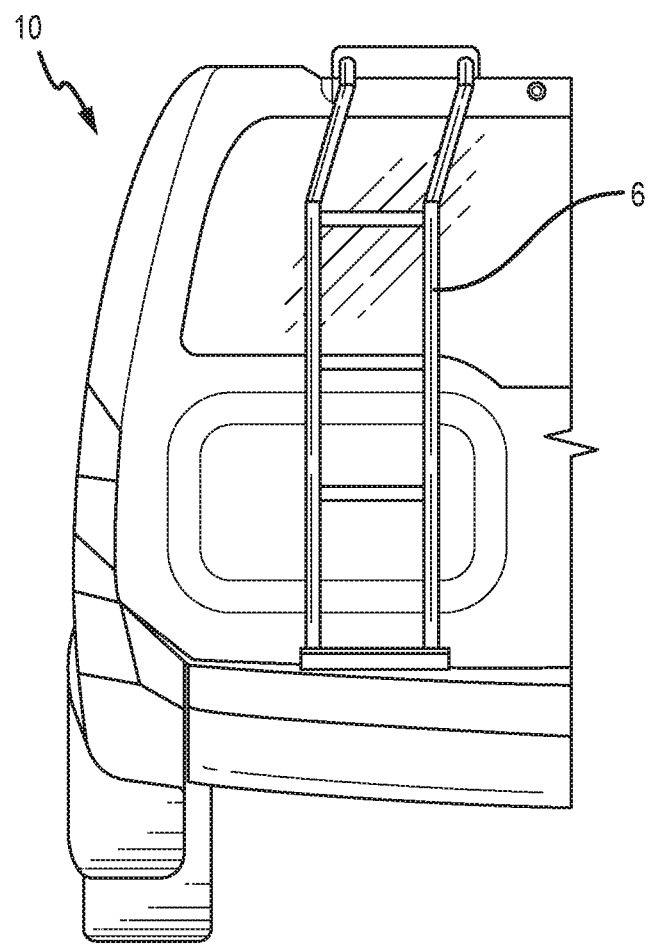
FIG. 1 is a rear elevation view showing a ladder interconnected to a vehicle.

To assist in the understanding of one embodiment of the present invention the following list of components and associated numbering found in the drawings is provided herein:

| # | Component |
|---|---|
| 2 | Ladder interconnection system |
| 6 | Ladder |
| 10 | Vehicle |
| 14 | Hanger plate |
| 18 | Clamp |
| 20 | Rear vehicle door |

| # | Component |
|---|---|
| 22 | Masking tape |
| 26 | Upper portion |
| 30 | Tape |
| 34 | Lower surface |
| 38 | Curled segment |
| 42 | Upper edge |
| 46 | Hinge |
| 50 | Gap |
| 54 | Stud |
| 58 | Upper surface |
| 62 | Hooked segment |
| 66 | Lip |
| 72 | Ladder upper portion (also referred to as the upper bracket) |
| 76 | Washer |
| 80 | Nut |
| 84 | Ladder lower portion (also referred to as the lower bracket) |
| 88 | Inner surface |
| 92 | First portion |
| 96 | Outer surface |
| 100 | Second portion |
| 104 | Third portion |
| 108 | Set screw |
| 112 | Pinch plate |
| 116 | Fourth portion |
| 120 | Bolt |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 1-21 show a ladder interconnection system 2 used to interconnect a ladder 6 to a vehicle 10. The ladder interconnection system 2 of one embodiment of the present invention comprises a hanger plate 14 and a clamp 18. Those of ordinary skill in the art will appreciate that one advantage of this and other embodiments of the present invention is that the ladder interconnection system 2 does not require penetrations into the vehicle 10. Penetrations create a fluid flow path conducive to rusting. FIG. 1 shows the ladder 6 interconnected to the vehicle 10, which commonly used with SUVs as accessing a storage box or vehicle rack is difficult.

Figure 2:
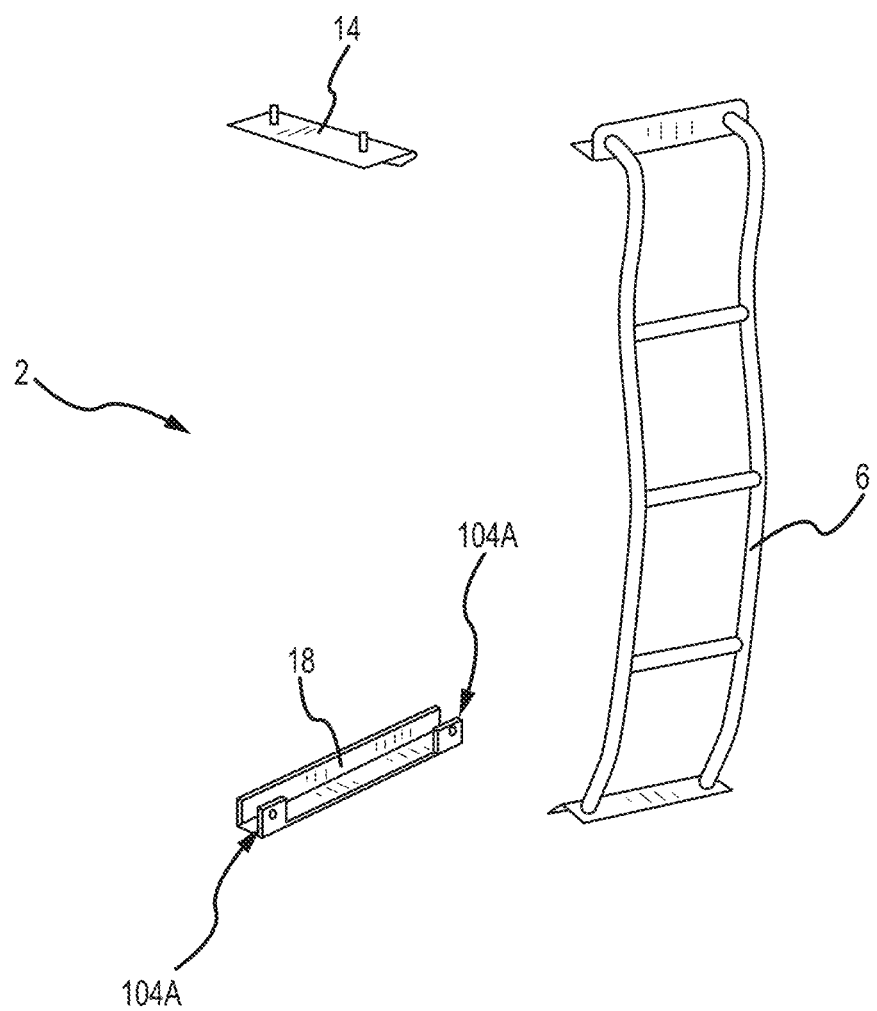
FIG. 2 is an exploded view of a ladder interconnection system of one embodiment of the present invention.

FIG. 2 is an exploded view of the ladder interconnection system 2 of one embodiment of the present invention. The ladder 6 is interconnected to the vehicle 10 using the hanger plate 14 and the clamp 18. The hanger plate 14 is adapted for interconnection to an upper portion of the vehicle's rear door. Once the hanger plate 14 is in place, an upper portion or bracket 72 of the ladder is interconnected to the hanger plate 14, which positions the lower portion or bracket 84 of the ladder 6 adjacent to the lower edge of the rear door. The lower ladder portion is then secured to the rear door with the clamp 18. Again, the hanger plate 14 and clamp to not require penetrations into the vehicle. Further, as a ladder 6, hanger plate 14, and clamp 18 are interconnected to edges of the rear door, the ladder will travel with the rear door.

Figure 3:
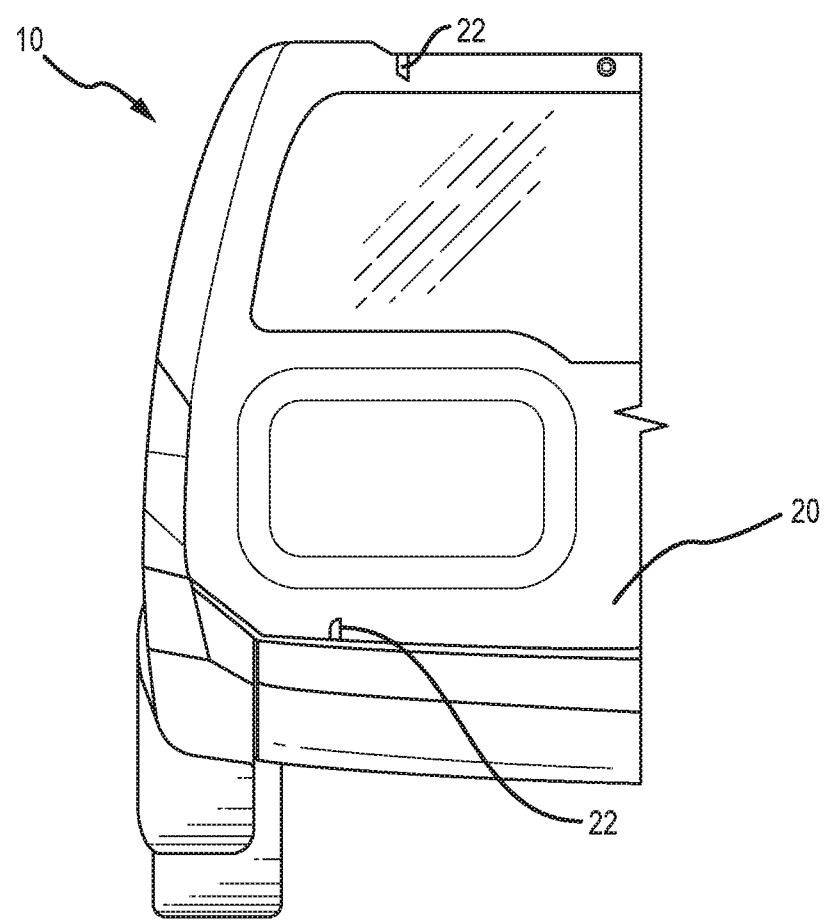
FIG. 3 is a rear elevation view showing a vehicle before the ladder interconnection system is interconnected to the vehicle.

FIG. 3 shows the rear vehicle door 20. To install the hanger plate and clamp, one would use masking tape 22 to mark the desired location of the ladder. By using masking 22, one can gauge the proper ladder location so the ladder does not obscure lights and the hanger plate will not interfere with the proper functioning of the rear door 20 by contacting the hinge that secures a rear door 20 to the vehicle 10.

Figure 4:
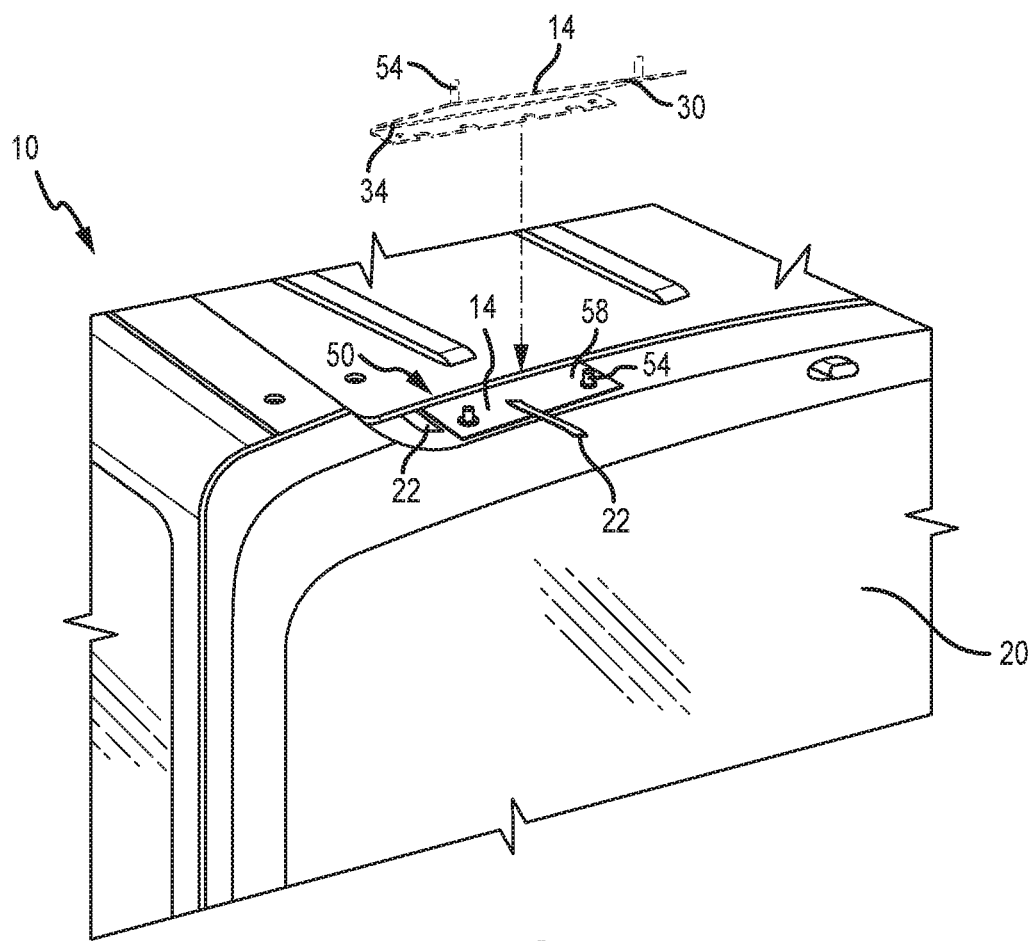
FIG. 4 is a partial perspective view showing an upper surface of a vehicle's rear door, wherein a hanger plate has been interconnected thereto.
Figure 5:
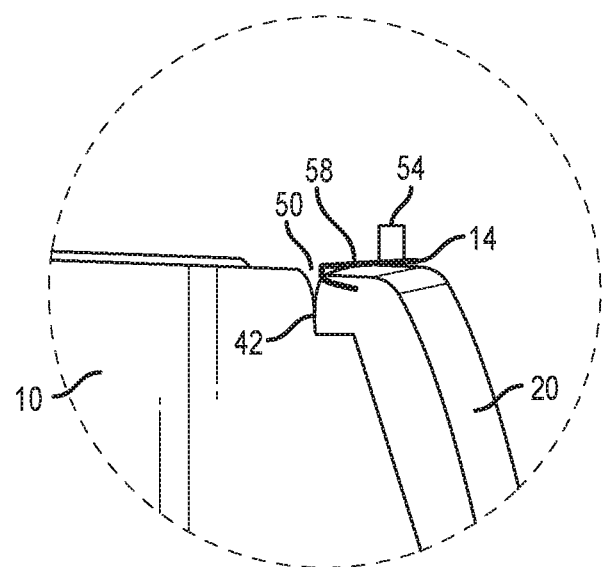
FIG. 5 is a detailed side elevation view showing the hanger plate of one embodiment of the present invention interconnected to the rear door.
Figure 6:
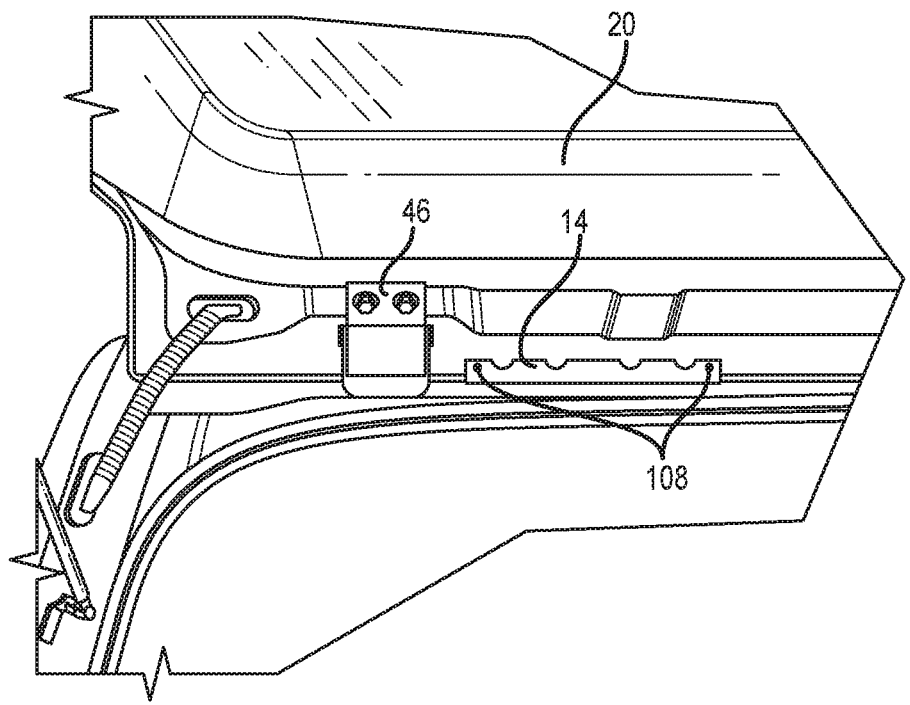
FIG. 6 is a partial rear elevation view wherein the rear door is in an open position, and wherein a portion of the hanger plate is visible.

FIGS. 4-6 illustrate how the hanger plate 14 is interconnected to an upper portion 26 of the rear door 20. Here, to avoid marring the upper portion 26 of the rear door, tape 30 or foam is added to the lower surface 34 of the hanger plate 14, which is adapted to interface with the upper portion 26 or edge of the rear door 20. A curled segment 38 is also wrapped around an upper edge 42 of the rear door 20. The curled segment 38 prevents the hanger plate 14 from being removed upwardly or away from the vehicle. But, as the hanger plate 14 is not bolted or otherwise fastened to the rear door 20, the ladder can slide laterally along the upper edge 42. This functionality allows the user to align the hanger plate 14 with the masking tape 22 to ensure that the hanger plate 14 does not interfere with the rear door hinge 46 as shown in FIG. 6. The hanger plate is shaped so it fits within a gap 50 between the upper portion 26 of the rear door 20 and the vehicle 10 when the rear door is closed.

FIG. 5 shows that the hanger plate 14 does not interfere with the gap 50 between the rear door 20 and the vehicle 10 so the rear door 20 can open and close without impacting the hanger plate 14. FIG. 5 also shows a stud 54 extending from the upper surface 58 of the hanger plate 14 designed to receive corresponding holes in an upper portion (or upper bracket) of the ladder. The ladder is connected to the hanger plate 14 by securing the studs 54 with nuts.

Figure 7:
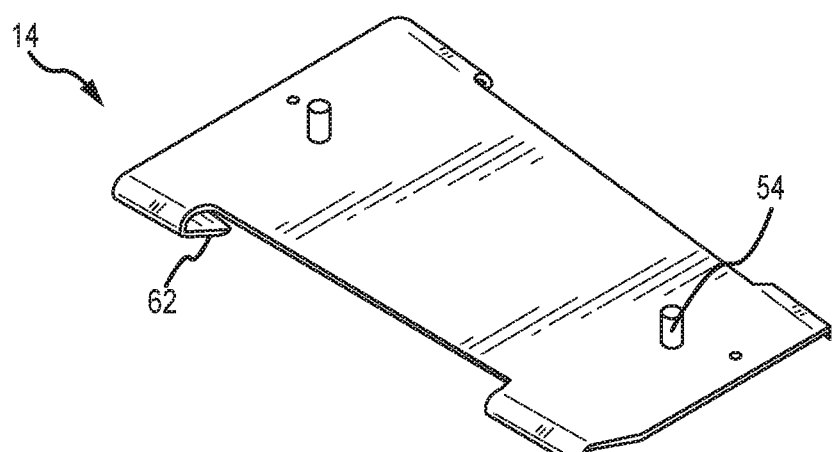
FIG. 7 is a top perspective view of a hanger plate of one embodiment of the present invention.
Figure 8:
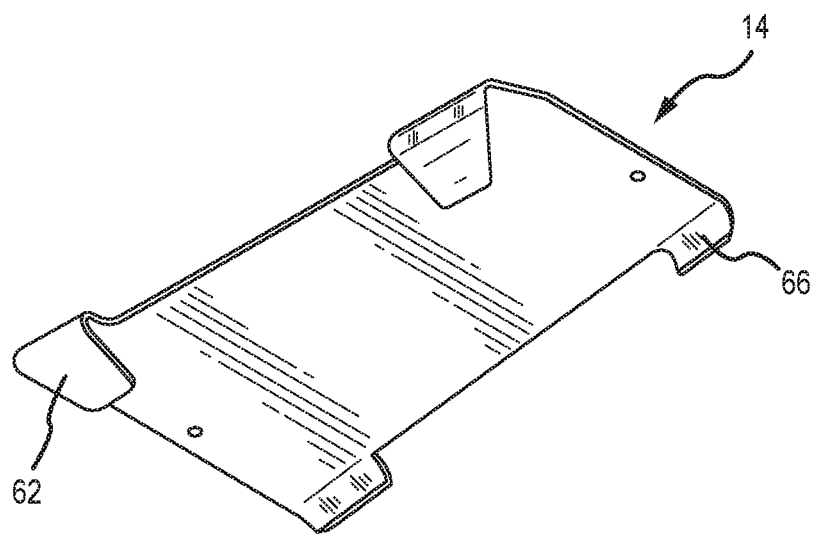
FIG. 8 is a bottom perspective view of the hanger plate shown in FIG. 7.

FIGS. 7 and 8 show a hanger plate 14 of one embodiment of the present invention, which may be used on a Jeep® Cherokee®. The hanger plate 14 includes an upper surface 58 with two studs extending therefrom. The hanger plate also includes two hooked segments 62 for engagement to the upper edge of the rear door's upper portion. The hanger plate includes two corresponding lips 66 for engagement with an outer edge of the rear door's upper surface.

Figure 9:
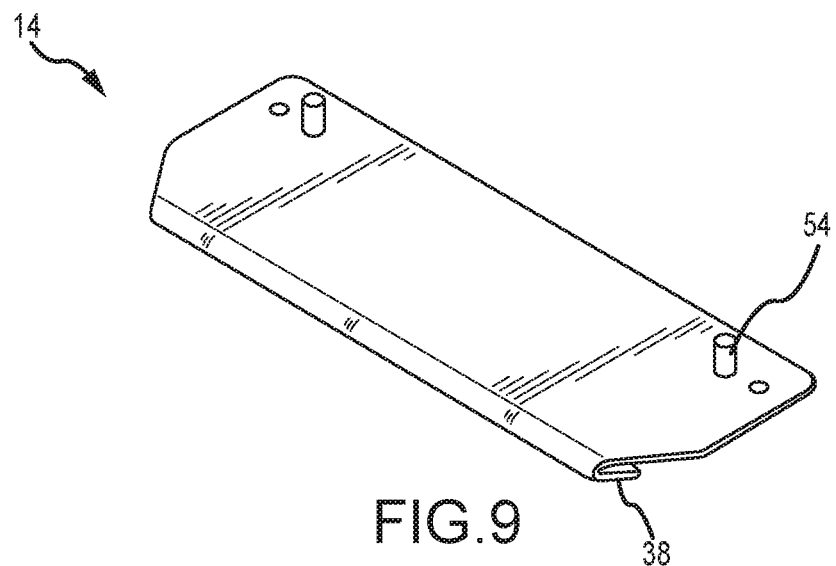
FIG. 9 is a top perspective view of a hanger plate of another embodiment of the present invention.
Figure 10:
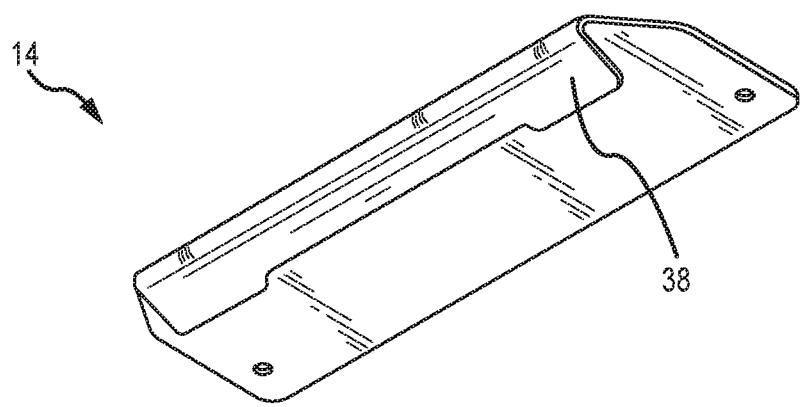
FIG. 10 is a bottom perspective view of the hanger plate of FIG. 9.

FIGS. 9 and 10 show a hanger plate 14 of another embodiment of the present invention, which may be used on a Honda® Element®. The hanger plate 14 includes an upper surface 58 with two studs 54 extending therefrom. The hanger plate 14 also includes a curled segment 38 for engagement with the upper edge of the rear door.

Figure 11:
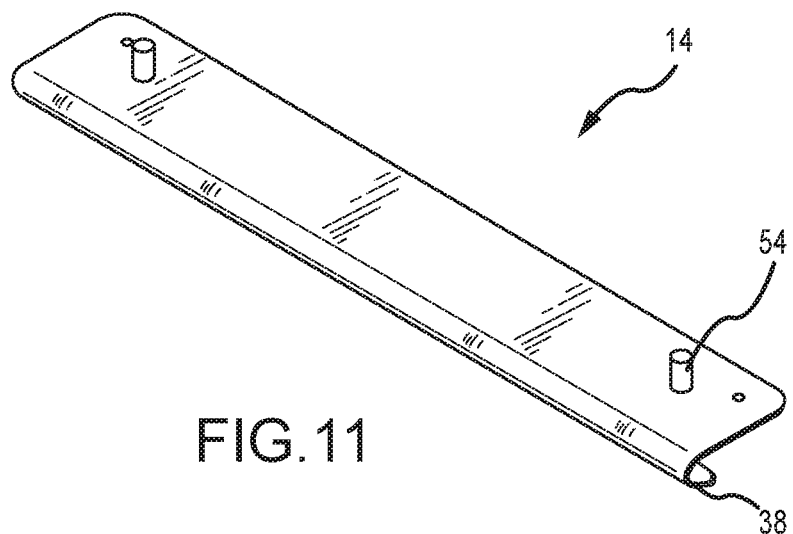
FIG. 11 is a top perspective view of a hanger plate of another embodiment of the present invention.
Figure 12:
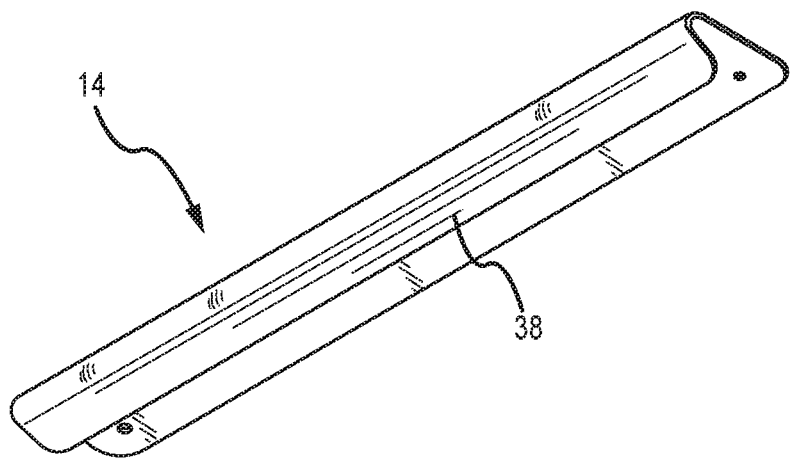
FIG. 12 is a bottom perspective view of the hanger plate shown in FIG. 11.

FIGS. 11 and 12 show a hanger plate 14 of another embodiment, which may be used on a Toyota® FJ Cruiser®. The hanger plate 14 includes an upper surface 58 with two studs 54 extending therefrom. The hanger plate 14 also includes a curled segment 38 for engagement with the upper edge of the rear door.

Figure 13:
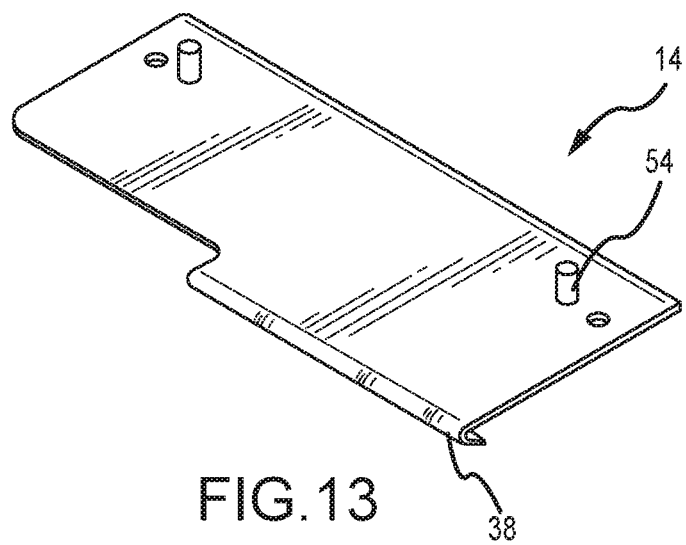
FIG. 13 is a top perspective view of a hanger plate of another embodiment of the present invention.
Figure 14:
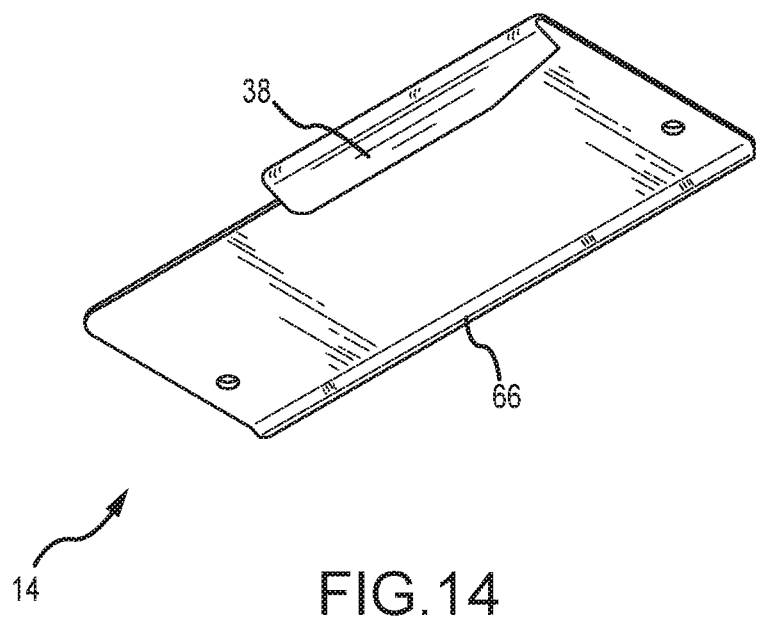
FIG. 14 is a bottom perspective view of the hanger plate of FIG. 13.

FIGS. 13 and 14 show a hanger plate 14 of another embodiment of the present invention, which can be used on a Toyota® 4Runner®. The hanger plate 14 includes an upper surface 58 with two studs 54 extending therefrom. Hanger plate 14 also includes a curled segment 38 for engagement with the upper edge of the rear door. The hanger plate 14 includes a corresponding lip 66 for engagement with an outer edge of the rear door. Again, the curled portion and lip helps prevent movement of the hanger plate along the vehicle's longitudinal direction.

Figure 15:
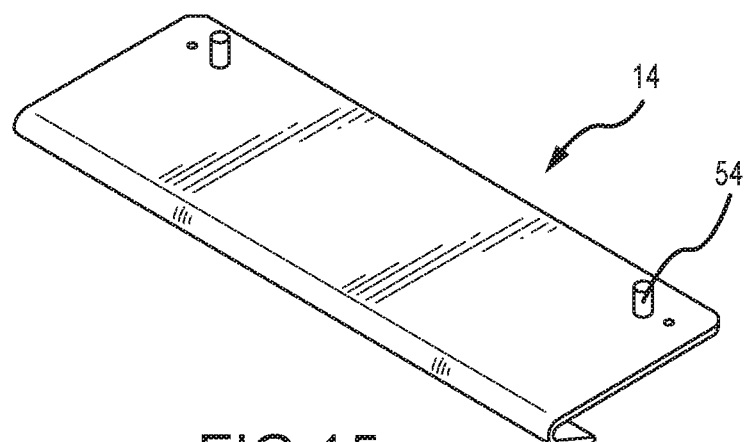
FIG. 15 is a top perspective view of a hanger plate of another embodiment of the present invention.
Figure 16:
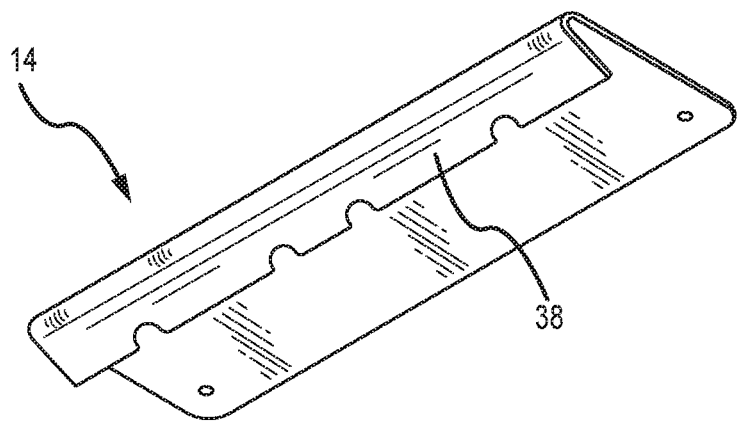
FIG. 16 is a bottom perspective view of the hanger plate illustrated in FIG. 15.

FIGS. 15 and 16 show a hanger plate 14 of another embodiment of the present invention, which may be used on a Nissan® Xterra®. The hanger plate 14 includes an upper surface 58 with two studs extending therefrom. The hanger plate 14 also includes a curled segment 38 for engagement with an upper edge of the rear door. The curled segment may include cutouts to accommodate items positioned within the vehicle's rear door, such as bolt heads.

Figure 17:
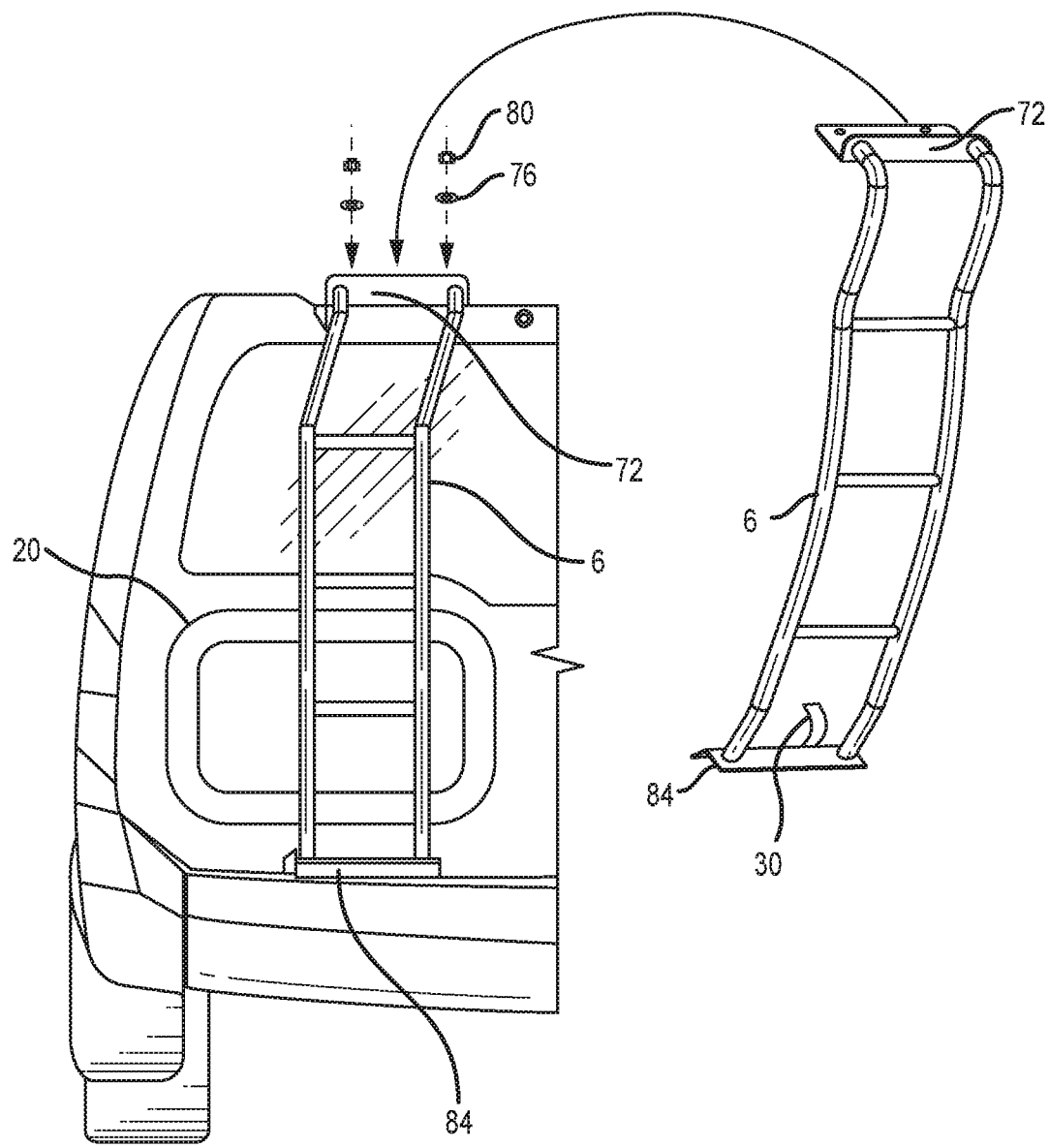
FIG. 17 is a rear elevation view showing a ladder interconnected to a vehicle.

FIG. 17 illustrates how the ladder 6 of one embodiment of the present invention is interconnected to the hanger plate 14. Here, an upper portion 72 (which is also referred to as an upper bracket 72) of the ladder having apertures or slots (not shown) is placed over the studs 54 extending from the hanger plate 14. The ladder 6 is then fastened to the hanger plate 14 via washers 76 and nuts 80. This operation secures the ladder 6 to the rear door 20, but it can still move laterally along the rear door 20. This functionality allows the user to ensure the ladder 6 is in the correct position before the clamp is engaged.

Although the hanger plates described above include at least one stud that receives and secures the ladder, those of ordinary skill in the art will appreciate that the ladder may be hung from the hanger plate in other ways. For example, the hanger plate of one embodiment of the present invention includes a peg or pegs that extend from the hanger plate that are received into recesses or slots provided in the ladder upper portion or upper bracket, wherein nuts are not required to secure the ladder. Alternatively, the ladder upper portion or bracket may include one or more pegs, or other type of protrusion, that fit into cavities, holes, or slots, provided in the hanger plate. The ladder upper portion may include a hook or curled portion that fits within a cavity, fits within a hole, or engages onto a complementary hook on the hanger plate. The hanger plate may have an extended cavity that receives the complementary extension protruding from the upper ladder portion, or vice versa. In some embodiments, the interconnection between the upper ladder portion and the hanger plate allows some adjustment of the ladder's position along the lateral direction of the vehicle. For example, the area of engagement between the hanger plate and the upper ladder portion may include slotted holes, serrations, or other mechanisms known in the art that allow minute adjustments between interconnected components. Stated in general, one of skill in the art should appreciate upon review of this disclosure that the method of interconnection between the ladder and a hanger plate may not be relevant in some embodiments of the present invention. This is because the primary purpose of the hanger plate is to allow a ladder to hang therefrom.

Figure 18:
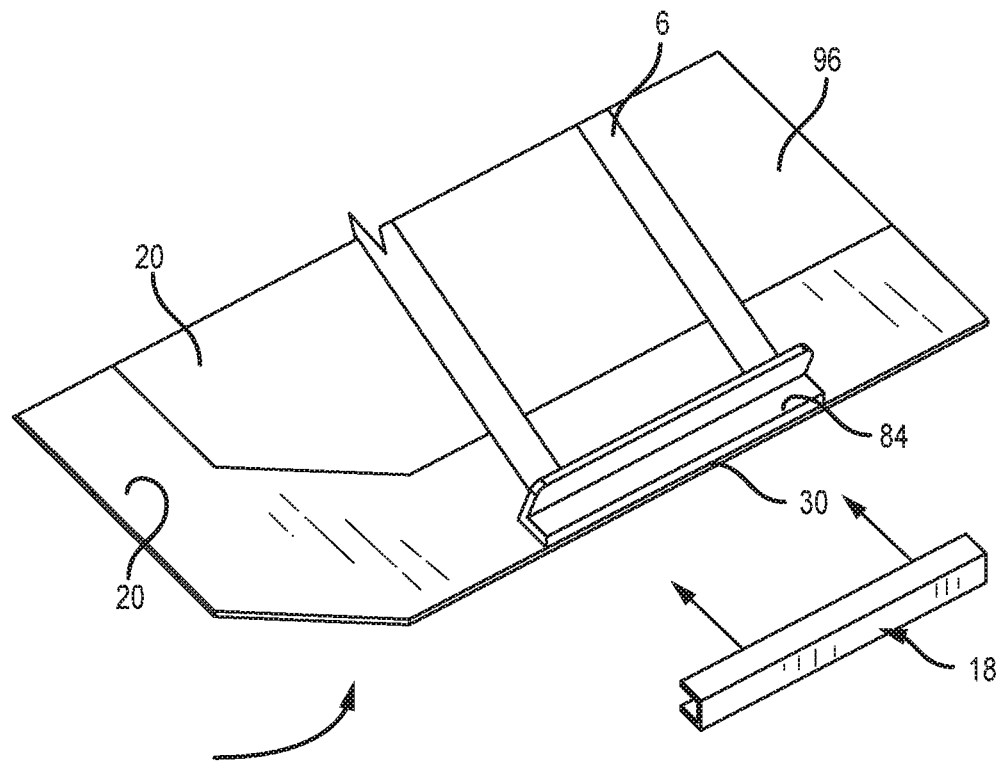
FIG. 18 is a partial perspective view showing a clamp interconnecting a lower portion of the ladder to the rear door.
Figure 19:
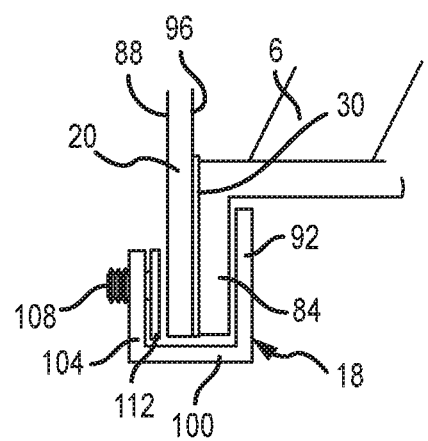
FIG. 19 is a side detailed view showing the clamp of FIG. 18 interconnecting a lower portion of the ladder to the rear door.

FIGS. 18 and 19 show how the lower portion 84 (which is also referred to as the lower bracket) of the ladder is interconnected to the rear door 20, with FIG. 19 being a detailed side view of a portion of FIG. 18. Here, the rear door 20 is opened to expose the inner surface 88 thereof. The clamp 18, which is a generally U-shaped member in this embodiment of the present invention, includes a first portion 92 adapted for positioning on an outer surface 96 of the rear door 20, a second portion 100, and a third portion 104 adapted for positioning at the inner surface 88 of the rear door 20. As done interconnecting the hanger plate to the rear door, tape 30 or foam may mask the area of engagement of the ladder's lower portion 84 (which is also referred to as the lower bracket 84) to the rear door. Once the lower portion or bracket 84 is engaged to the rear door 20, a set screw 108 is used to tighten the clamp 18 on to the rear door 20 and ladder 6. Those of ordinary skill in the art will appreciate that to help prevent marring of the rear surface of the door, and to spread point loads, the set screws 108 may be associated with the pinch plate 112 that contacts the rear door's inner surface 88.

Figure 20:
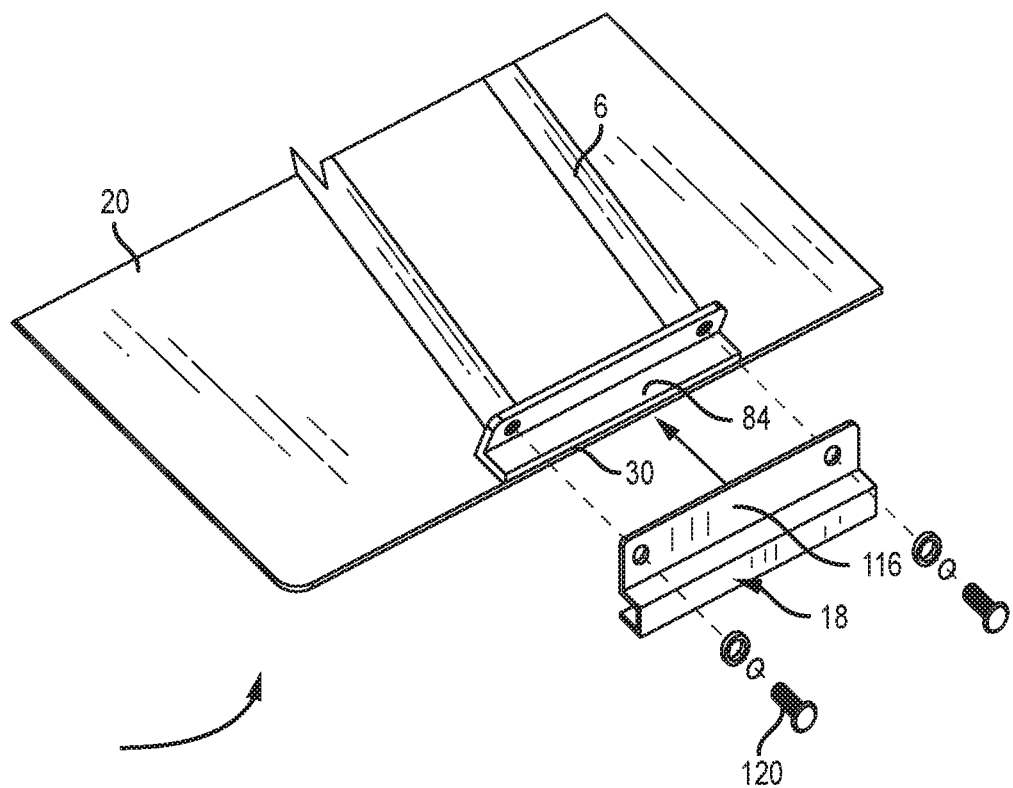
FIG. 20 is a partial perspective view showing a clamp of another embodiment of the present invention interconnecting a lower portion of the ladder to the rear door.
Figure 21:
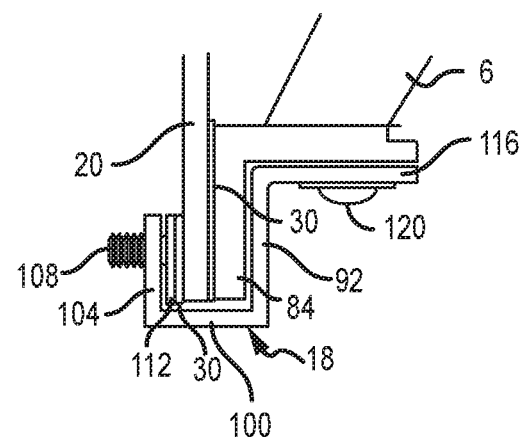
FIG. 21 is a side detailed view showing the clamp of FIG. 20 interconnecting a lower portion of the ladder to the rear door.

FIG. 20 shows another embodiment of the present invention wherein the clamp 18 has a fourth portion 116 that extends from the first portion 92, with FIG. 21 being a detailed side view of a portion of FIG. 20. The fourth portion 116 may be perpendicular to the first portion 92 and is adapted to further engage the ladder 6 with one or more bolts 120. The third portion 104 is divided into a first flange 104A and a second flange 104B as indicated in FIG. 2.

While various embodiments of the present invention have been described in detail, it is apparent that modifications and alterations of those embodiments will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A clamp system for interconnecting a ladder to a lower portion of a rear door of a vehicle, comprising:
    a fastener;
    a clamp, comprising:
        a first plate that is generally planar with an upper surface and a lower surface, wherein the upper surface is adapted to be positioned adjacent to a lower edge of the rear door when the clamp is interconnected to the rear door, wherein the first plate has a first width;
        a second plate that is generally planar and that extends upwardly from the upper surface of the first plate, the second plate having an inner surface and an outer surface, wherein the inner surface is adapted to be positioned proximate to an outer surface of the rear door when the clamp is interconnected to the rear door;
        a first flange extending upwardly from the upper surface of the first plate and including a first aperture oriented toward the second plate;
        a second flange extending upwardly from the upper surface of the first plate and including a second aperture oriented toward the second plate; and
        a third plate extending outwardly from the outer surface of the second plate and away from the first and second flanges, wherein the third plate includes an aperture for the fastener, the aperture spaced from the second plate by a predetermined distance, and wherein the third plate has a third width approximately equal to the first width; and
    the ladder comprising a lower bracket adapted to be positioned proximate to the third plate, the lower bracket comprising a hole that is alignable with the aperture of the third plate, wherein the fastener is operable to extend through the aperture and into the hole to interconnect the ladder to the third plate.

2. The clamp system of claim 1, wherein the first plate extends from a first edge to a second edge opposite to the first edge, the first edge spaced from the second edge by the first width of the first plate, wherein the second plate has a second width approximately equal to the first width.

3. The clamp system of claim 1, wherein the second plate has a second width, and wherein the third width is approximately equal to the second width.

4. The clamp system of claim 1, wherein the third plate is oriented approximately perpendicular to the second plate.

5. The clamp system of claim 1, further comprising a pinch plate selectively engaged by screws extending through the first and second apertures, wherein the pinch plate is positioned proximate to an inner surface of the rear door when the clamp is interconnected to the rear door.

6. The clamp system of claim 1, wherein:
   the first plate has a first thickness;
   the second plate has a second thickness; and
   the third plate has a third thickness, the third thickness being approximately equal to the first thickness.

7. The clamp system of claim 1, wherein the first and second flanges are approximately perpendicular to the first plate, and wherein the second plate is approximately perpendicular to the first plate.

\* \* \* \* \*